(12) United States Patent
Srivastava et al.

(10) Patent No.: US 12,510,571 B2
(45) Date of Patent: Dec. 30, 2025

(54) CURRENT MODE TIME-TO-DIGITAL CONVERTER-BASED POWER DETECTOR

(71) Applicant: Apple Inc., Cupertino, CA (US)

(72) Inventors: Ankit Srivastava, San Diego, CA (US); David M Signoff, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 18/107,383

(22) Filed: Feb. 8, 2023

(65) Prior Publication Data
US 2024/0264210 A1   Aug. 8, 2024

(51) Int. Cl.
*G01R 21/133* (2006.01)
*G04F 10/00* (2006.01)
*H04B 17/00* (2015.01)

(52) U.S. Cl.
CPC ......... *G01R 21/133* (2013.01); *G04F 10/005* (2013.01); *H04B 17/00* (2013.01)

(58) Field of Classification Search
CPC ..... G01R 21/133; G04F 10/005; H04B 17/00; H04B 17/102; H04B 17/11; H04B 17/21
USPC ..................................................... 455/67.11
See application file for complete search history.

(56) References Cited

U.S. PATENT DOCUMENTS

| | | | |
|---|---|---|---|
| 4,774,457 A | 9/1988 | Dunn | |
| 6,178,313 B1 | 1/2001 | Mages | |
| 6,859,762 B2 | 2/2005 | Mawet | |
| 7,138,858 B2 | 11/2006 | Marques | |
| 7,679,874 B2 | 3/2010 | Barbehenn | |
| 9,203,509 B2 | 12/2015 | Wang | |
| 9,846,446 B2 | 12/2017 | Choi | |
| 11,411,573 B2 | 8/2022 | Verma | |
| 2003/0229662 A1* | 12/2003 | Luick | G06F 1/206 718/107 |
| 2013/0293281 A1* | 11/2013 | Baumann | G06F 1/305 327/365 |
| 2016/0315719 A1* | 10/2016 | Jian | H04B 17/13 |

(Continued)

OTHER PUBLICATIONS

V. Bhagavatula et al., "A 5G FR2 Power-Amplifier With an Integrated Power-Detector for Closed-Loop EIRP Control," in IEEE Journal of Solid-State Circuits, vol. 57, No. 5, pp. 1257-1266, May 2022, doi: 10.1109/JSSC.2022.3146872.

(Continued)

*Primary Examiner* — Don N Vo
(74) *Attorney, Agent, or Firm* — Fletcher Yoder, P.C.

(57) ABSTRACT

A power detector includes a first current mirror that receives an input signal and generates a mirrored input signal, a first oscillator that reverses a first current of the mirrored input signal based on a voltage of the mirrored input signal reaching a threshold, and a first counter that generates a first count of each period generated by the first oscillator. The power detector also includes a second current mirror that receives a reference signal and generates a mirrored reference signal, a second oscillator that reverses a second current of the mirrored reference signal based on a voltage of the mirrored reference signal reaching the threshold, and a second counter that generates a second count of each period generated by the second oscillator. A processor then determine the power of the input signal based on the first count and the second count.

20 Claims, 10 Drawing Sheets

(56) References Cited

U.S. PATENT DOCUMENTS

2023/0123370 A1* 4/2023 Hernandez .......... H03M 1/0604
381/113

OTHER PUBLICATIONS

Siraporn Sakphrom, Apinunt Thanachayanont; A Low-Power CMOS RF Power Detector; 2012 19th IEEE International Conference on Electronics, Circuits, and Systems (ICECS 2012).

Michele Dei et al.. "A 10-bit Linearity Current-Controlled Ring Oscillator with Rolling Regulation for Smart Sensing" BMicroelectronics and Electronic Systems, Universitat Autònoma de Barcelona, Spain 2017 IEEE.

Zhao, Junhong et al., "CMOS Current-controlled Oscillators", Department of Electrical and Computer Engineering Concordia University Montreal, Canada, 2007 IEEE.

* cited by examiner

CURRENT MODE TIME-TO-DIGITAL CONVERTER-BASED POWER DETECTOR

BACKGROUND

The present disclosure relates generally to wireless communication, and more specifically to determining power in a wireless communication device.

In a wireless communication device, power detectors may be used to determine or detect power for a variety of reasons. For example, a power detector may determine transmission power of a transmitter of the wireless communication device, which may control or adjust the transmission power based on the determined transmission power. As another example, a power detector may determine power of a received signal to implement mitigation actions to prevent desensitization of a receiver of the wireless communication device due to blocking elements in the received signal (e.g., elements that block transmission or reception of other signals). As yet another example, a power detector may be used to calibrate components of the wireless communication device. However, such power detectors, which operate in the voltage domain (e.g., determining power based on voltage), may be limited in performance.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device includes one or more antennas, and a transceiver coupled to the one or more antennas. The transceiver includes a power detector having a first current mirror configured to receive an input signal, and a second current mirror configured to receive a reference signal. The transceiver also includes a first oscillator coupled to the first current mirror, a first counter coupled to the first oscillator, a second oscillator coupled to the second current mirror, and a second counter coupled to the second oscillator.

In another embodiment, a transceiver includes one or more amplifiers, and a power detector coupled to the one or more amplifiers. The power detector includes a first current mirror configured to receive an input signal and generate a mirrored input signal, and a second current mirror configured to receive a reference signal and generate a mirrored reference signal. The power detector also includes a first oscillator configured to generate a first clock signal based on a first current of the mirrored input signal and a first counter configured to generate a first count based on a first number of clock cycles of the first clock signal. The power detector further includes a second oscillator configured to generate a second clock signal based on a second current of the mirrored reference signal, and a second counter configured to generate a second count based on a second number of clock cycles of the second clock signal.

In yet another embodiment, a method for power detection includes reversing a first current of a first signal, and generating a first count based on the first current being reversed. The method also includes reversing a second current of a second signal, and generating a second count based on the second current being reversed. The method further includes outputting an indication of a power of the first signal based on the first count and the second count.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
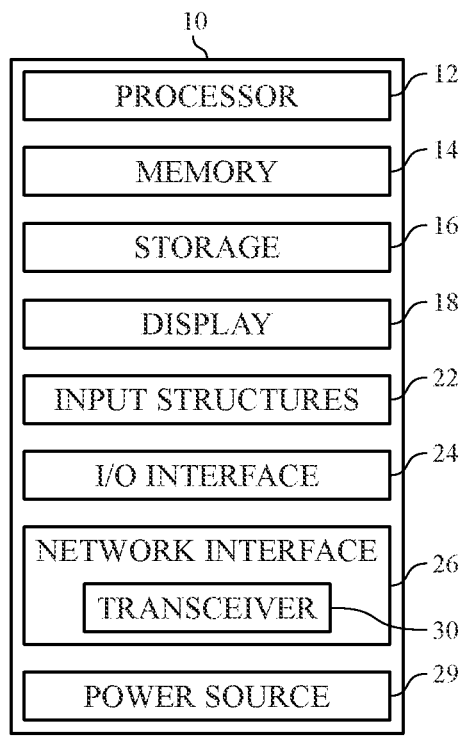
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to determining or detecting power in a current domain (e.g., determining power based on current). That is, voltage domain power detectors (e.g., that determine power based on voltage) may be limited in performance because an input signal (e.g., for which power is to be detected) with lower power may be overwhelmed by noise (e.g., fundamental noise) or not have sufficiently high power to load devices in a radio frequency chain (e.g., amplifiers, mixers, and so on), while an input signal with higher power may have a higher peak-to-average power ratio (PAPR) which may result in compression and/or distortion. In some cases, performance may be improved by including large capacitors (e.g., having greater than 10 picofarads), though such capacitors may use up valuable space in a wireless communication device and/or take excessive settling time before use.

Embodiments herein provide various apparatuses and techniques to determine power without relying on the voltage domain. In particular, the disclosed embodiments determine power based on current by converting current of an input signal to a clock signal having a frequency that is linearly related to the current. Clock cycles of the clock signal are then counted to generate a digital code. As such, the disclosed power detectors may be said to include a time-to-digital converter (TDC) and/or an analog-to-digital converter (ADC). Determining the power in the current domain may decrease modulation error and a voltage headroom limitation, which may be a result of operating in the voltage domain. Decreasing the voltage headroom limitation may enable increasing a signal level (e.g., voltage or power level) of an input signal with lower power such that it may not be overwhelmed by noise, thus improving overall performance of the power detector.

Moreover, integrating the ADC feature in the disclosed power detector may reduce complexity in a wireless communication device, compared to using voltage domain power detectors. This is because voltage domain power detectors may not integrate the ADC feature, as such power detectors output an analog voltage, which is then converted by an external ADC to a digital value. In some applications, such as millimeter wave (mmWave) and beamforming, numerous (e.g., greater than 100) power detectors may be used in a wireless communication device. To reduce the amount of surface area used by these external ADCs, outputs of these power detectors may be multiplexed together into a large multiplexed array to a lesser number (e.g., less than ten) of ADCs, which, while saving space, increases complexity of the circuitry in the wireless communication device. Building in the ADC functionality (e.g., without using these external ADCs) in the disclosed, current-based power detector may save more space and/or reduce complexity when compared to implementing a voltage-based power detector.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, Long Term Evolution (LTE®) cellular network, Long Term Evolution License Assisted Access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
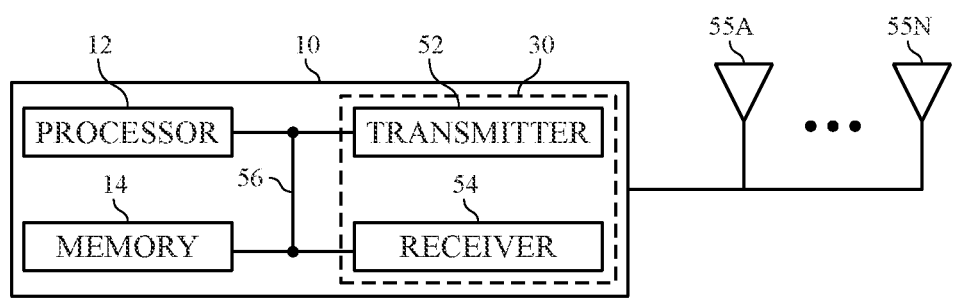
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
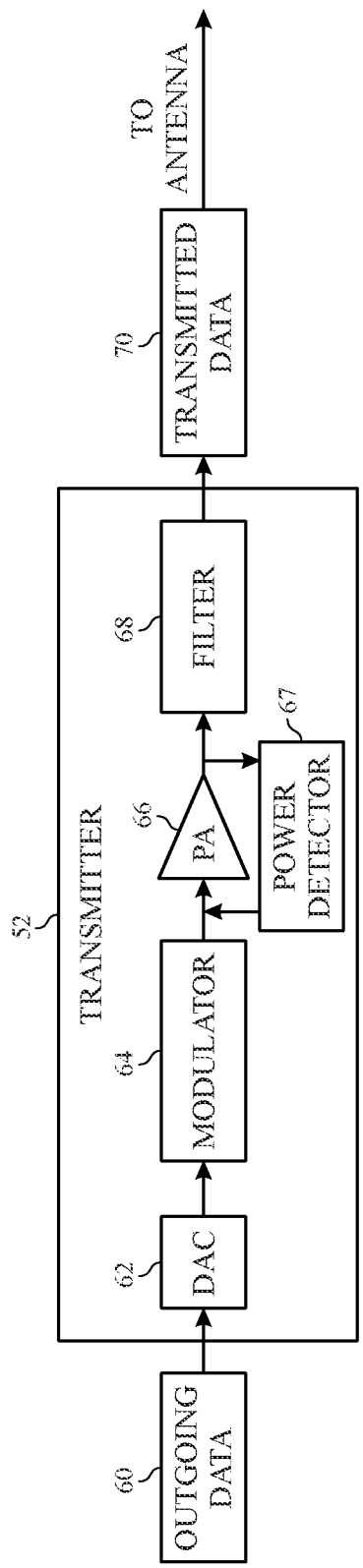
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A power detector 67 may determine or detect power at an output of the power amplifier 66. In some embodiments, the power amplifier 66 may be representative of multiple power amplification stages, and the power detector 67 may be representative of multiple power detectors 67, such that a respective power detector 67 may be coupled at an output of a respective power amplification stage to determine a power amplification of the respective power amplification stage. The power amplifier 66 and/or power amplification stage may be adjusted based on the power determined by the power detector 67. A filter 68 (e.g., filter circuitry and/or software) of the transmitter 52 may remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE), and more specifically, a transmit front end (TXFE) of the electronic device 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary). In additional or alternative embodiments, the power detector 67 may be coupled at an output of any other suitable component of the transmitter 52 (e.g., a mixer of the transmitter 52).

Figure 4:
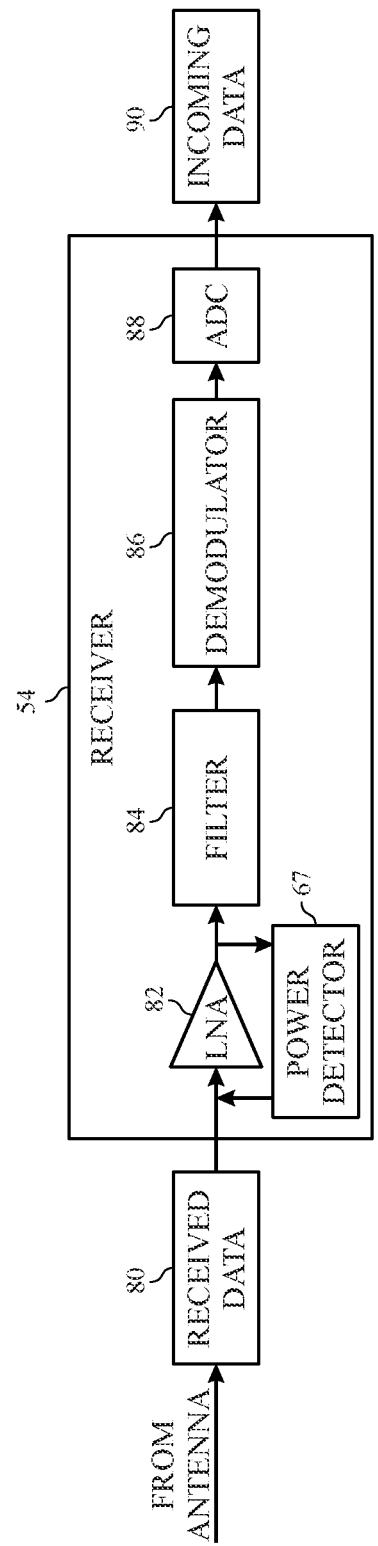
FIG. 4 is a schematic diagram of a receiver of the electronic device of FIG. 1, according to embodiments of the present disclosure.

FIG. 4 is a schematic diagram of the receiver 54 (e.g., receive circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. A power detector 67 may determine or detect power at an output of the LNA 82. In some embodiments, the LNA 82 may be representative of multiple low noise amplification stages, and the power detector 67 may be representative of multiple power detectors 67, such that a respective power detector 67 may be coupled at an output of a respective low noise amplification stage to determine a power amplification of the respective low noise amplification stage. The LNA 82 and/or low noise amplification stage may be adjusted based on the power determined by the power detector 67. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. The low noise amplifier 82 and/or the filter 84 may be referred to as part of the RFFE, and more specifically, a receiver front end (RXFE) of the electronic device 10.

A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter. In additional or alternative embodiments, the power detector 67 may be coupled at an output of any other suitable component of the transmitter 52 (e.g., a mixer of the receiver 54).

As discussed above, power detectors that operate in the voltage domain (e.g., that determine power based on voltage) may be limited in performance because an input signal (e.g., for which power is to be detected) with lower power may be overwhelmed by noise (e.g., fundamental noise) or not have sufficiently high power to load devices in a radio frequency chain (e.g., amplifiers, mixers, and so on), while an input signal with higher power may have a higher peak-to-average power ratio (PAPR) which may result in compression and/or distortion, and thus error in the power detector reading. Thus, these limitations may result in the voltage domain power detector having a limited range in which it may operate with sufficient linearity. While performance of a voltage domain power detector may be improved by including large capacitors (e.g., having greater than 10 picofarads), such capacitors may use up valuable space in an electronic device and/or take excessive settling time before use.

Figure 5:
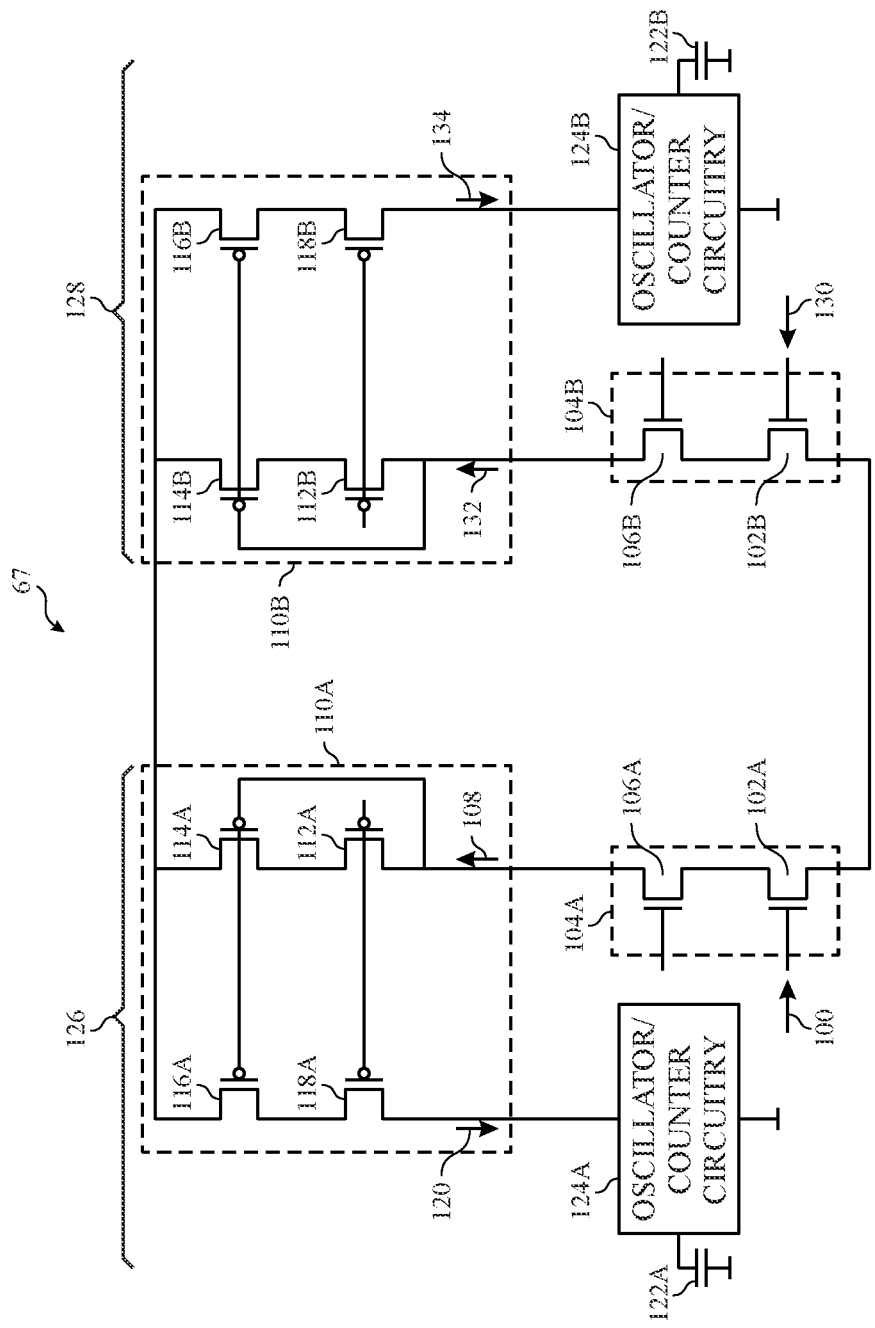
FIG. 5 is a circuit diagram of a current mode power detector of the transmitter of FIG. 3 and/or the receiver of FIG. 4, according to embodiments of the present disclosure.

Embodiments herein provide various apparatuses and techniques to determine power without relying on the voltage domain. FIG. 5 is a circuit diagram of a current mode power detector 67, according to embodiments of the present disclosure. The power detector 67 determines power of an input signal 100 based on current, rather than voltage, thus operating in the current domain and being referred to as a current mode power detector. As illustrated, a first transistor 102A of a square current circuit 104A may receive the input signal 100. The square current circuit 104A may also include a second transistor 106A. The square current circuit 104A may output a mean square input current signal 108, which is then received by diode current mirror circuitry 110A. The current mirror 110A includes a first transistor 112A, a second transistor 114A, a third transistor 116A, and a fourth transistor 118A. Each transistor 112A, 114A, 116A, 118A is illustrated as a P-channel metal-oxide-semiconductor field-effect transistor (MOSFET), though other implementations are contemplated (e.g., N-channel MOSFETs). As illustrated, a source of the first transistor 112A may be coupled to a gate of the second transistor 114A, a drain of the second transistor 114A may be coupled to a source of the third transistor 116A, a drain of the third transistor 116A may be coupled to a source of fourth transistor 118A, a gate of the first transistor 112A may be coupled to a gate of the fourth transistor 118A, and the gate of the second transistor 114A may be coupled to a gate of the third transistor 116A, though any suitable implementation of the transistors 112A, 114A, 116A, 118A is contemplated to enable the current mirror 110A to generate a mirrored input current signal 120 (e.g., reproduce the square input current signal 108) at an output of the current mirror 110A (e.g., a drain of the fourth transistor 118A). The current mirror 110A may include a cascode device to prevent demodulation of the mirrored input current signal 120 due to voltage in the current mirror 110A. A capacitor 122A may receive the mirrored input current signal 120 output by the current mirror 110A.

As the mirrored input current signal 120 is received by the capacitor 122A, the capacitor 122A stores increasing voltage linearly. The capacitor 122A is coupled to oscillator (or inverter) and counter circuitry 124A that inverts or folds voltage of the mirrored input current signal 120 when it reaches a higher threshold or reaches a lower threshold, and keeps a count of each inversion, or every two inversions. The oscillator and counter circuitry 124A may be implemented using any suitable circuitry, such as an oscillator to invert the voltage of the mirrored input current signal 120, and a counter to keep count of each inversion, or every two inversions.

Figure 6:
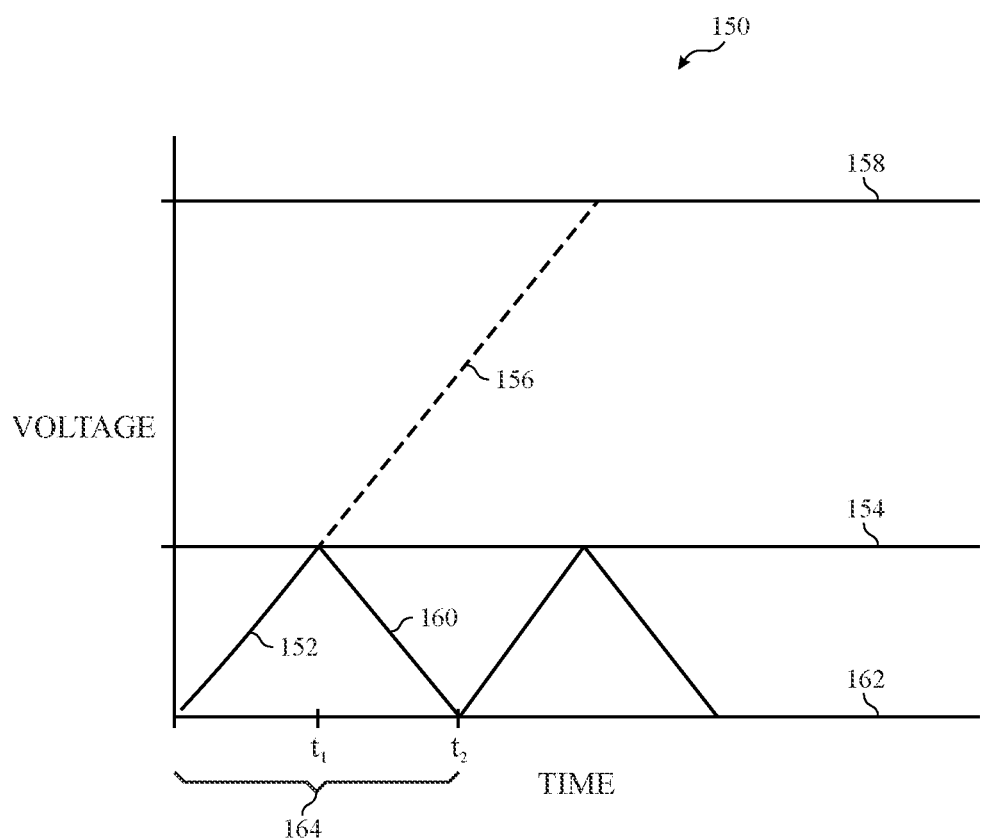
FIG. 6 is a plot of inverting voltage of a mirrored input current signal in the current mode power detector of the transmitter of FIG. 5, according to embodiments of the present disclosure.

FIG. 6 is a plot 150 of inverting the voltage 152 of the mirrored input current signal 120, according to embodiments of the present disclosure. As discussed above, the oscillator and counter circuitry 124A may invert the voltage 152 of the mirrored input current signal 120, and count the number of inversions, or every two inversions. The plot 150 includes a horizontal axis representing time and a vertical axis representing voltage 152 of the mirrored input current signal 120. Without the oscillator r and counter circuitry 124A inverting the voltage 152 at a first threshold voltage value 154 (e.g., a higher or maximum threshold voltage value), the voltage 152 would increase (e.g., linearly) above the first threshold voltage value 154, resulting in a rising slope or edge, as shown by the voltage 156, until it reaches a voltage headroom limitation 158 of the capacitor 122A. Instead, the oscillator and counter circuitry 124A may invert the voltage 152 when it reaches the first threshold voltage value 154 (e.g., at time $t_1$), causing the voltage 152 to decrease (e.g., linearly), resulting in a falling slope or edge, as shown by the voltage 160. When the voltage 152 reaches a second threshold voltage value 162 (e.g., a lower or minimum threshold voltage value, at time $t_2$), the oscillator and counter circuitry 124A may again invert the voltage 152, causing the voltage 152 to increase (e.g., linearly). The oscillator and counter circuitry 124A may continue to invert the voltage 152 as it reaches the first threshold voltage value 154 or the second threshold voltage value 162. The oscillator and counter circuitry 124A may also count the number of times it inverts the voltage 152 (e.g., at time $t_1$), or every other time it inverts the voltage 152 (e.g., generating a period 164 of the voltage 152 signal, such as at time $t_2$).

The circuitry described thus far may be part of a first branch 126 of the power detector 67, which may be referred to as a primary or main branch. The power detector 67 may also include a second branch 128, which may be referred to as a secondary or reference branch. This is because the reference branch 128 may receive a reference signal 130, as opposed to the input signal 100. Similar to the main branch 126, the reference branch 128 may include a first transistor 102B of a square current circuit 104B that may receive the reference signal 130. The square current circuit 104B may also include a second transistor 106B. The square current circuit 104B may output a mean square reference current signal 132, which is then received by diode current mirror circuitry 110B. The current mirror 110B includes a first transistor 112B, a second transistor 114B, a third transistor 116B, and a fourth transistor 118B. Each transistor 112B, 114B, 116B, 118B is illustrated as a P-channel MOSFET, though other implementations are contemplated (e.g., N-channel MOSFETs). As illustrated, a source of the first transistor 112B may be coupled to a gate of the second transistor 114B, a drain of the second transistor 114B may be coupled to a source of the third transistor 116B, a drain of the third transistor 116B may be coupled to a source of fourth transistor 118B, a gate of the first transistor 112B may be coupled to a gate of the fourth transistor 118B, and the gate of the second transistor 114B may be coupled to a gate of the third transistor 116B, though any suitable implementation of the transistors 112B, 114B, 116B, 118B is contemplated to enable the current mirror 110B to generate a mirrored reference current signal 134 (e.g., reproduce the square reference current signal 132) at an output of the current mirror 110B (e.g., a drain of the fourth transistor 118B). The current mirror 110B may include a cascode device to prevent demodulation of the mirrored reference current signal 134 due to voltage in the current mirror 110B. A capacitor 122B may receive the mirrored reference current signal 134 output by the current mirror 110B.

Like the capacitor 122A of the main branch 126, as the mirrored reference current signal 134 is received by the capacitor 122B, the capacitor 122B stores increasing voltage linearly. The capacitor 122B is coupled to oscillator and counter circuitry 124B that inverts or folds voltage of the mirrored reference current signal 134 when it reaches a higher threshold or reaches a lower threshold, and keeps a count of each inversion, or every two inversions, as discussed with reference to FIG. 6. The oscillator and counter circuitry 124B may be implemented using any suitable circuitry, such as an oscillator to invert the voltage of the mirrored reference current signal 134, and a counter to keep count of each inversion, or every two inversions. It should be understood that, while the power detector 67 shown in FIG. 5 is a single-ended circuit, in additional or alternative embodiments, the power detector 67 may be implemented as a differential circuit.

Figure 7:
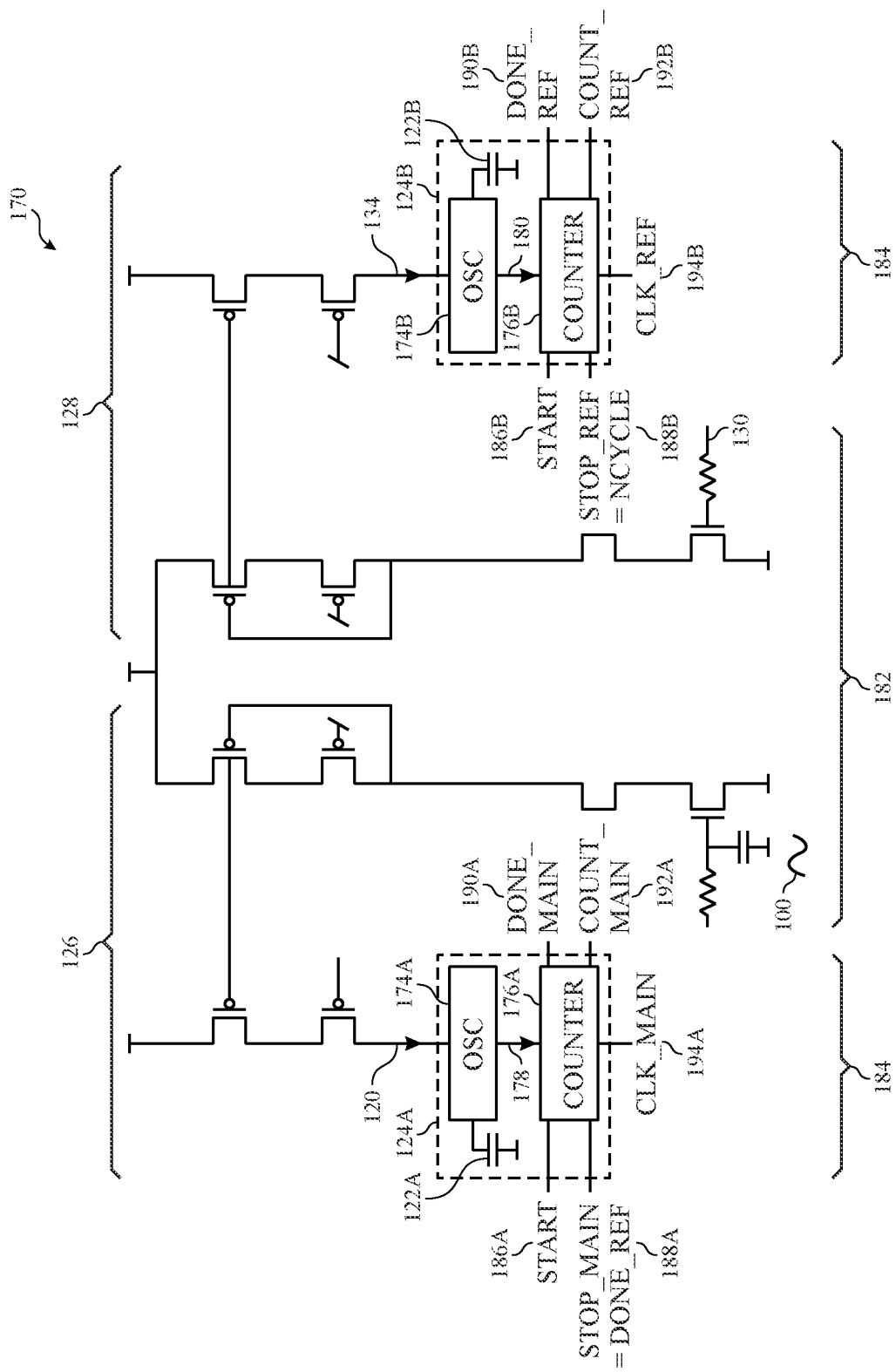
FIG. 7 is a circuit diagram of an example implementation circuit of the current mode power detector of FIG. 5, according to embodiments of the present disclosure.

FIG. 7 is a circuit diagram of an example implementation circuit 170 of the current mode power detector 67, according to embodiments of the present disclosure. The input signal 100 received by the main branch 126 may include a radio frequency input signal having an input voltage. The reference signal 130 received by the reference branch 128 may include a fixed, bias voltage. The oscillator and counter circuitry 124A of the main branch 126 may include an oscillator 174A and a counter 176A, and the oscillator and counter circuitry 124B of the reference branch 128 may include an oscillator 174B and a counter 176B. The oscillators 174A, 174B (collectively 174) may include analog circuit components, such as current-controlled oscillators (ICOs). Having the oscillator 174A in the main branch 126 and the oscillator 174B in the reference branch 128 may reduce or cancel noise, variations, or non-idealities in the input signal 100 and/or the oscillators 174 (e.g., of a first order). The oscillator 174A receives the mirrored input current signal 120 and may generate an input clock signal 178 that is related (e.g., linearly related) to a current of the mirrored input current signal 120. Similarly, the oscillator 174B receives the mirrored reference current signal 134 and may generate a reference clock signal 180 that is related (e.g., linearly related) to a current of the mirrored reference current signal 134. In this manner, the oscillators 174 may convert current information of the input signal 100 and the reference signal 130 into frequency information, as represented by the input clock signal 178 and the reference clock signal 180, respectively. The counter 176A may generate a count of a number of edges (e.g., rising edges, falling edges, or both) of the input clock signal 178, and the counter 176B may generate count of a number of edges (e.g., rising edges, falling edges, or both) of the reference clock signal 180.

The square current circuits 104A, 104B (collectively 104) and a first portion (e.g., half) of the diode current mirror circuitries 110A, 110B (collectively 110) coupled to the square current circuits 104 may be referred to as a first stage or core 182 of the current mode power detector 67, while the oscillator and counter circuitries 124A, 124B (collectively 124) and a second portion (e.g., half) of the diode current mirror circuitries 110 coupled to the oscillator and counter circuitries 124 may be referred to as a second or TDC-ADC stage 184 of the current mode power detector 67. As illustrated, the first portions of the diode current mirror circuitries 110 of the first stage 182 may include a load of an inverse of a transconductance of the diode current mirror circuitries 110 (e.g., 1/gm), which may be referred to as a diode load. Accordingly, a signal swing at the first portions of the diode current mirror circuitries 110 of the first stage 182 may be reduced or low, which may enable the first stage 182 to perform cascading and other techniques. The first stage 182 may thus reduce or be optimized for noise, temperature drift, and/or linearity, resulting in a reduced or eliminated modulation error time constraint. Operating the first stage 182 with low gain and a small output voltage swing may result in high linearity. The second stage 184 may allow current to be integrated using the oscillators 174. That is, because the power detector 67 does not convert the input signal 100 into the voltage domain, and instead the oscillators 174 converts current (e.g., of the mirrored input current signal 120 and/or the mirrored reference current signal 134) into a frequency, the power detector 67 is not limited by a voltage supply headroom (e.g., 158). This may result in an increased or large dynamic range of operation.

Each counter 176A, 176B (collectively 176) may receive (e.g., as inputs) a respective START signal 186A, 186B (collectively 186) for starting the respective counter 176, and a STOP signal 188A, 188B (collectively 188) for stopping the respective counter 176. As illustrated, the STOP_REF signal 188B input to the reference counter 176B may include a target or desired number of cycles (e.g., rising edges, falling edges, or both) generated by the oscillator 174B from the mirrored reference current signal 134. The number of cycles may be predetermined and/or set by the processor 12, a user, or any other suitable device or entity. That is, if the STOP_REF signal 188B is set at 100 cycles, then the reference counter 176B may count the number of cycles generated by the oscillator 174B from the mirrored reference current signal 134 and stop counting once 100 cycles is reached. Upon reaching a number of cycles indicated in a STOP signal 188, the respective counter 176 may generate an output in the form of a done signal 190A, 190B (collectively 190). Each counter 176 may also output the count (e.g., a current count of the respective counter 176) in the form of a count signal 192A, 192B (collectively 192). For example, as illustrated, upon reaching the number of cycles indicated in the STOP_REF signal 188B, the reference counter 176B may output a DONE_REF signal 190B and a COUNT_REF signal 192B (e.g., reflecting the final count). The main counter 176A may receive, as an input STOP_MAIN signal 188A, the DONE_REF signal 190B from the reference counter 176B. That is, the reference counter 176B may cause the main counter 176A to stop counting when the counter 176B reaches the set or target number of cycles (e.g., n cycles). The main counter 176A may also receive a clock signal CLK_MAIN 194A (e.g., from the mirrored input current signal 120), and the reference counter 176B may receive a clock signal CLK_REF 194B (e.g., from the mirrored reference current signal 134).

Figure 8:
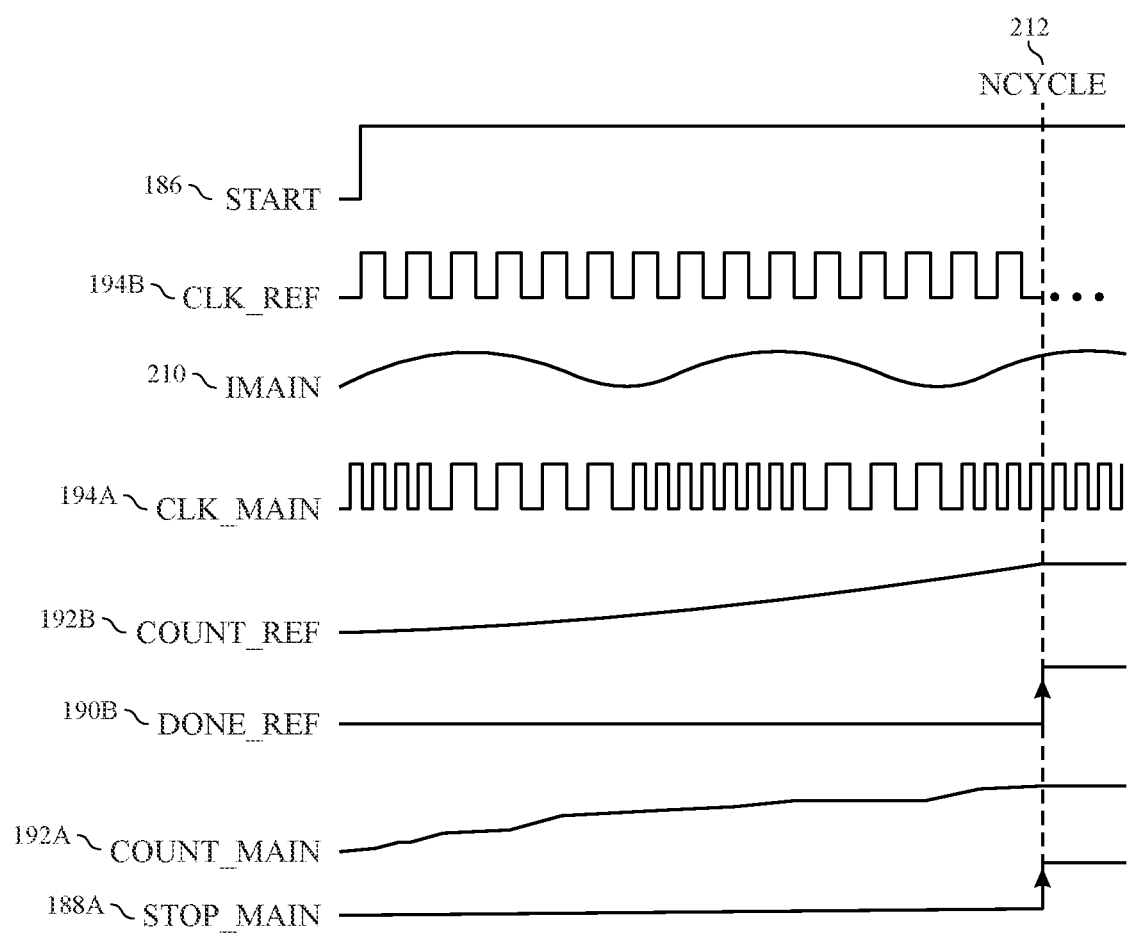
FIG. 8 is a timing diagram of operating the current mode power detector of FIG. 5, according to embodiments of the present disclosure

FIG. 8 is a timing diagram of operating the current mode power detector 67, according to embodiments of the present disclosure. The START signal 186 may be sent to both counters 176 to cause the main counter 176A to begin counting the number of cycles generated by the oscillator 174A from the mirrored input current signal 120 and cause the reference counter 176B to begin counting the number of cycles generated by the oscillator 174B from the mirrored reference current signal 134. The clock signal CLK_REF 194B received by the reference counter 176B may include a fixed clock signal (e.g., having a fixed, constant frequency) because current of the reference signal 130 may be a fixed bias current. Current ($I_{MAIN}$) 210 of the mirrored input current signal 120 is shown as a modulated signal because the input signal is within a radio frequency envelope. As illustrated, the clock signal CLK_MAIN 194A received by the main counter 176A may correspond to $I_{MAIN}$ 210. That is, as $I_{MAIN}$ 210 increases, frequency of CLK_MAIN 194A also increases, and as $I_{MAIN}$ 210 decreases, frequency of CLK_MAIN 194A also decreases. It should be understood that $I_{MAIN}$ 210 and CLK_MAIN 194A are only shown as examples, as the input signal 100 carries data, and thus $I_{MAIN}$ 210 and CLK_MAIN 194A may be more random or irregular than that shown in FIG. 8. As mentioned above, the count signal COUNT_REF 192B provides a current count of the reference counter 176B, which counts each rising edge of the CLK_REF 194B signal. As such, over time, COUNT_REF 192B increases until it reaches the set or target number of cycles, n cycles 212. When the count of the reference counter 176B, as indicated by COUNT_REF 192B, reaches n cycles 212, then reference counter 176B generates the DONE_REF signal 190B (illustrated as going to a logical high value, such as 1). As mentioned above, the DONE_REF signal 190B may be used as a stop signal for main branch 126 (e.g., by setting the STOP_MAIN signal 188A to the DONE_REF signal 190B). As such, the main counter 176A may stop counting along with the reference counter 176B.

That is, the reference branch 128 is used to time or synchronize with the main branch 126. Advantageously, the oscillators 174 may be identical so that variations between the oscillators 174, such as those related to inverter trip point ("Delta V"), process, voltage, and/or temperature, among other, may be reduced or canceled. In particular, total time (TOTAL TIME) for the power detector 67 to detect power is fixed, which may be decided, as discussed above, by the reference counter 176B. A target time ($T_{Ref}$) that voltage drifts or changes (ΔV) in the reference capacitor 122B may be defined by a time domain equation:

$$T_{Ref} = \frac{C}{I_{Ref}} \Delta V \qquad \text{(Equation 1)}$$

Figure 9:
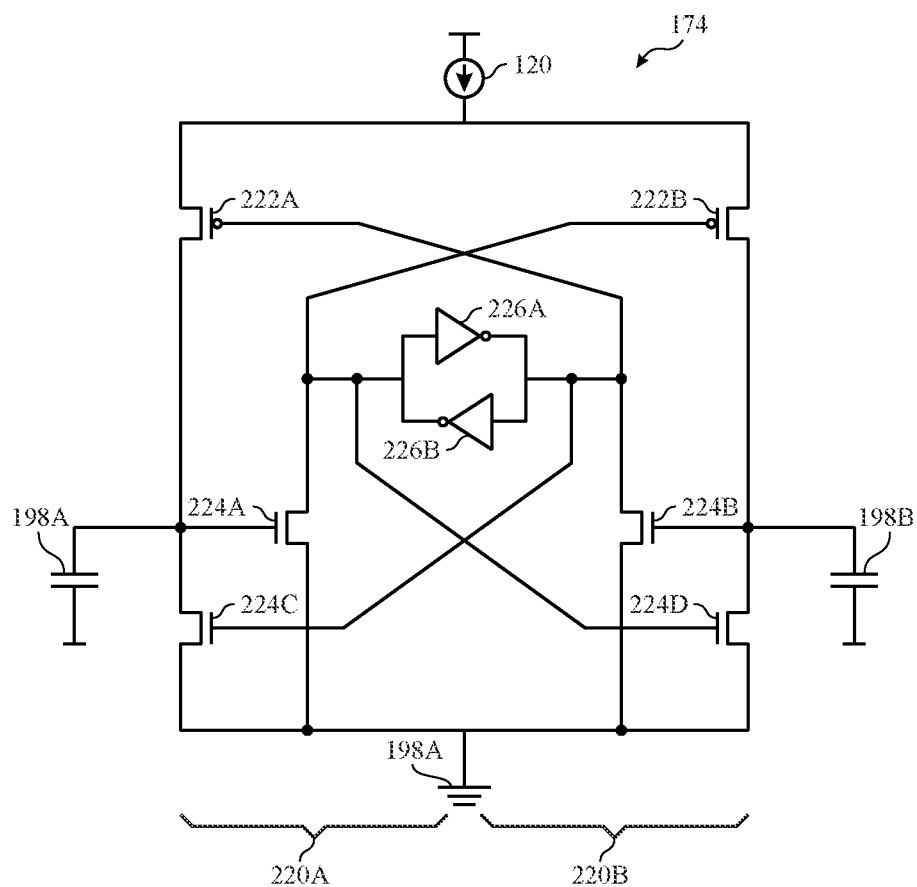
FIG. 9 is a circuit diagram of an example oscillator of the current mode power detector of FIG. 5 coupled to a capacitor, according to embodiments of the present disclosure.

$I_{Ref}$ may refer to current in the reference capacitor 122B, which may be received from the mirrored reference current signal 134, and C may refer to capacitance of the reference capacitor 122B. FIG. 9 is a circuit diagram of an example oscillator 174 coupled to capacitors 198A, 198B (collectively 198), according to embodiments of the present disclosure. The example oscillator 174 may be an implementation for the main oscillator 174A and/or the reference oscillator 174B, though other implementations are contemplated, and the coupled capacitor 198 may include the main capacitor 122A and/or the reference capacitor 122B. It should be understood that the main capacitor 122A and/or the reference capacitor 122B may each include multiple capacitors 198, as shown in FIG. 9. The oscillator 174 may receive an input current $I_{in}$ from the mirrored input current signal 120 or the mirrored reference current signal 134, as shown in FIG. 7, which may travel to a first portion (e.g., side) 220A of the oscillator 174 or a second portion (e.g., side) 220B of the oscillator 174.

The oscillator 174 includes P-channel MOSFETs 222A, 222B (collectively 222), N-channel MOSFETs 224A, 224B, 224C, 224D (collectively 224), and oscillators 226A, 226B (collectively 226, which may operate as a latch). As illustrated, sources of the P-channel MOSFETs 222A, 222B may be coupled together with the input source current $I_{in}$. Additionally, a gate of the first P-channel MOSFET 222A may be coupled to a source of the second N-channel MOSFET 224B, a gate of the third N-channel MOSFET 224C, an output of the first oscillator 226A, an input of the second oscillator 226B, and a first capacitor 122. A gate of the second P-channel MOSFET 222B may be coupled to a source of the first N-channel MOSFET 224A, a gate of the fourth N-channel MOSFET 224D, an input of the first oscillator 226A, an output of the second oscillator 226B, and a second capacitor 122. A drain of the first N-channel MOSFET 224A may also be coupled to a source of the third N-channel MOSFET 224C, a ground 228, a drain of second N-channel MOSFET 224B, and a source of the fourth N-channel MOSFET 224D.

As an example, in operation, the first P-channel MOSFET 222A may be activated (e.g., operating as a closed switch or short circuit) and the second P-channel MOSFET 222B may be deactivated (e.g., operating as an open switch or open circuit). As such, the input current $I_{in}$ may travel through the first portion 220A of the oscillator 174, charging (e.g., increasing voltage in) the capacitor 198A and/or the latch formed by the oscillators 226. The first N-channel MOSFET 224A and/or the third N-channel MOSFET 224C may be deactivated during charging of the capacitor 198A and/or the latch formed by the oscillators 226. When voltage at the capacitor 198A and/or the first N-channel MOSFET 224A reaches a threshold (e.g., 5 volts (V) or less, 2.5 V or less, 1 V or less, such as 0.5 V), then the first N-channel MOSFET 224A and/or the third N-channel MOSFET 224C may activate, causing voltage at the source of the first N-channel MOSFET 224A and/or the latch formed by the oscillators 226 to discharge. This, in turn, causes the capacitor 198A to discharge (e.g., decrease in voltage). During this time, voltage in the capacitor 198B may stay at a constant discharged or minimum level (e.g., 0 V).

When the latch discharges or flips, the first P-channel MOSFET 222A may deactivate and the second P-channel MOSFET 222B may activate, causing the input current $I_{in}$ to stop traveling through the first portion 220A of the oscillator 174 and instead travel through the second portion 220B. Accordingly, the capacitor 198B and/or the latch formed by the oscillators 226 charges, while the second N-channel MOSFET 224B and/or the fourth N-channel MOSFET 224D may be deactivated. When voltage at the capacitor 198B and/or the second N-channel MOSFET 224B reaches a threshold (e.g., 5 volts (V) or less, 2.5 V or less, 1 V or less, such as 0.5 V), then the second N-channel MOSFET 224B and/or the fourth N-channel MOSFET 224D may activate, causing voltage at the source of the second N-channel MOSFET 224B and/or the latch formed by the oscillators 226 to discharge. This, in turn, causes the capacitor 198B to discharge (e.g., decrease in voltage). During this time, voltage in the capacitor 198A may stay at a constant discharged or minimum level (e.g., 0 V). When the latch discharges or flips, the second P-channel MOSFET 222B may deactivate and the first P-channel MOSFET 222A may activate, causing the input current $I_{in}$ to stop traveling through the second portion 220B of the oscillator 174 and instead travel through the first portion 220A. The process may then repeat.

The change in voltage of each capacitor 198 may be referred to as voltage change ΔV, as referred to in Equation 1 above. As such, $T_{Ref}$ may indicate when the capacitor 198 flips or inverts from the start of charging to being fully discharged. Similar to Equation 1, a target time ($T_{Main}$) that voltage drifts or changes (ΔV) in the main capacitor 122A may be defined by a time domain equation:

$$T_{Main} = \frac{C}{I_{Main}} \Delta V \qquad \text{(Equation 2)}$$

$I_{Main}$ may refer to current in the main capacitor 122A, which may be received from the mirrored input current signal 120, and C may refer to capacitance of the main capacitor 122A, which may be identical to that of the reference capacitor 122B as the capacitors may be identical. As such, a differentiating factor between Equations 1 and 2 is the currents $I_{Ref}$ and $I_{Main}$. In particular, a total time (TOTAL TIME) of operating the power detector 67 for n cycles 212 may be expressed by Equation 3 below:

$$\text{Total Time} = n_{cycle} \times T_{Ref} \qquad \text{(Equation 3)}$$

Based on Equation 1, Total Time may be expressed as:

$$\text{Total Time} = n_{cycle} \times \frac{C}{I_{Ref}} \Delta V \qquad \text{(Equation 4)}$$

Equation 4 may be expressed in terms of the main branch 126, as shown in Equation 5:

$$\text{Total Time} = \text{count\_main} \times \frac{C}{I_{Main}} \Delta V \qquad \text{(Equation 5)}$$

Due to the oscillators 174 being identical, C and ΔV are identical between Equations 1 and 2, enabling the terms to cancel out when setting Equation 4 equal to Equation 5. The result is shown in Equation 6 below:

$$\text{count\_main} = n_{cycle} \times \frac{I_{Main}}{I_{Ref}} \qquad \text{(Equation 6)}$$

That is, advantageously, the power detector 67 may not be sensitive to operational variations in the oscillators 174. A digital code representing power detected in the input signal 100, generated by the power detector 67, may be based on the COUNT_MAIN 192A, which is the count of the main counter 176A. The COUNT_MAIN 192A, as defined by Equation 6, may include an offset. In particular, setting $I_{Main}$ to a bias signal may result in $I_{Main}$ and $I_{Ref}$ being equal. In such a case, COUNT_MAIN 192A may then equal $n_{cycle}$, which may be the offset. Accordingly, the digital code or signal level representing power detected in the input signal 100 may be expressed as:

$$\text{code} = n_{cycle} \times \frac{I_{Main}}{I_{Ref}} - n_{cycle} \qquad \text{(Equation 7)}$$

The code may be expressed as simply a difference in counts between COUNT_MAIN 192A and COUNT_REF 192B:

$$\text{code} = \text{count\_main} - \text{count\_ref} \qquad \text{(Equation 8)}$$

The power detector 67 may then output the code as indication of the power level of the input signal 100. By integrating current in the capacitors 198 in the time domain, signal-to-noise ratio (SNR) may increase (e.g., linearly) when compared to oversampling in a scheme where averaging voltage of an input signal depends on noise (e.g., dithering noise). By converting current of the input signal 100 into a digital code that represents power of the input signal 100, the power detector 67 may be said to perform a time-to-digital conversion (TDC) and/or an analog-to-digital conversion (ADC). Determining the power in the current domain may decrease modulation error (e.g., resulting from determining power based on voltage of the input signal 100) and a voltage headroom limitation 158 (e.g., of the capacitors 122). Decreasing or avoiding the voltage headroom limitation 158 may enable increasing a signal level (e.g., voltage or power level) of the input signal 100 with lower power such that it may not be overwhelmed by noise, thus improving overall performance of the power detector 67.

Moreover, integrating the ADC feature in the power detector 67 may reduce complexity in the electronic device 10, compared to using voltage domain power detectors. This is because voltage domain power detectors may not integrate the ADC feature, as such power detectors output an analog voltage, which is then converted by an external ADC to a digital value. In some applications, such as millimeter wave (mmWave) and beamforming, numerous (e.g., greater than 100) power detectors may be used in a wireless communication device. To reduce the amount of surface area used by these external ADCs, outputs of these power detectors may be multiplexed together into a large multiplexed array to a lesser number (e.g., less than ten) of ADCs, which, while saving space, increases complexity of the circuitry in the wireless communication device. Building in the ADC functionality (e.g., without using these external ADCs) in the current-based power detector 67 may save more space and/or reduce complexity when compared to implementing a voltage-based power detector.

Figure 10:
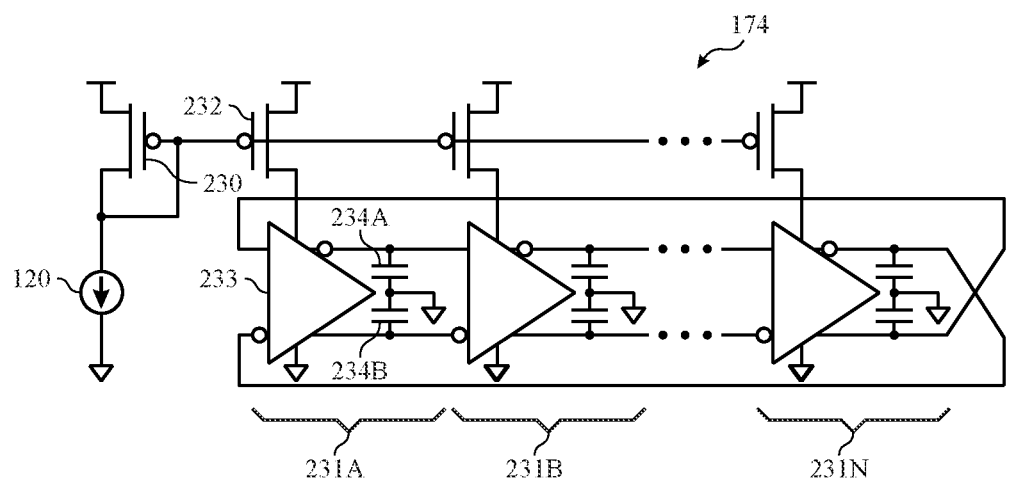
FIG. 10 is a circuit diagram of another example oscillator of the current mode power detector of FIG. 5, according to embodiments of the present disclosure.

It should be understood that the example oscillator 174 illustrated in FIG. 9 is included as an example, and any suitable device that may invert the mirrored input current signal 120 and/or the mirrored reference current signal 134 may be used in place of the oscillator 174. For example, FIG. 10 is a circuit diagram of another example oscillator 174 of the current mode power detector 67, according to embodiments of the present disclosure. The oscillator 174 may include a current-controlled ring oscillator, as illustrated, and may receive an input current $I_{in}$ from the mirrored input current signal 120 or the mirrored reference current signal 134, as shown in FIG. 7, which may travel to a P-channel MOSFET 230 of the oscillator 174. A gate of the P-channel MOSFET 230 may be coupled to its source, as well as to one or more delay stages 231A, 231B, . . . 231N (collectively 231). In particular, the oscillator 174 may include any suitable number of delay stages 231 (e.g., one or more, two or more, three or more, five or more, eight or more, twelve or more, and so on). Each delay stage 231 may include a P-channel MOSFET 232 having its gate coupled to the gate of the P-channel MOSFET 230. A source of each P-channel MOSFET 232 may be coupled to respective delay circuitry 233 of the delay stage 231, which in turn may be coupled to one or more capacitors 234A, 234B of the delay stage 231.

Figure 11:
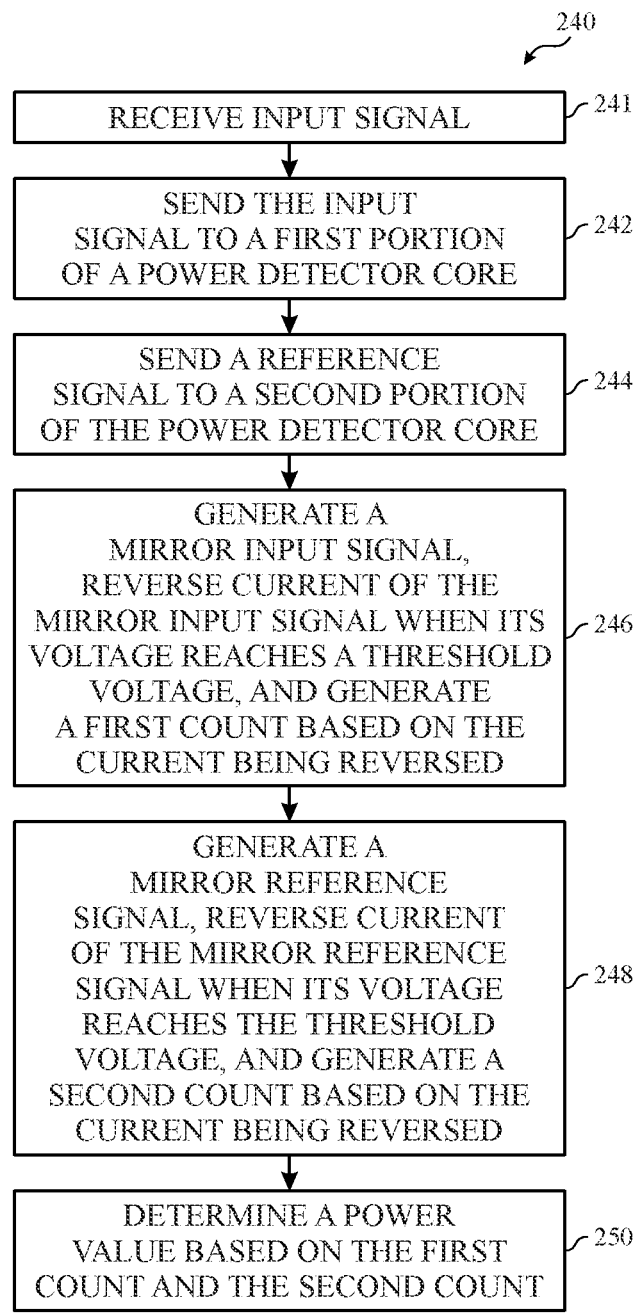
FIG. 11 is a flowchart of a method to determine power based on current, according to embodiments of the present disclosure.

FIG. 11 is a flowchart of a method 240 to determine power based on current, according to embodiments of the present disclosure. Any suitable device (e.g., a controller) that may control components (e.g., the power detector 67) of the electronic device 10, such as the processor 12 (e.g., a baseband or application processor), may perform the method 240. In some embodiments, the method 240 may be implemented by executing instructions stored in a tangible, non-transitory, computer-readable medium, such as the memory 14 or storage 16, using the processor 12. For example, the method 240 may be performed at least in part by one or more software or firmware components, such as an operating system of the electronic device 10, one or more software applications of the electronic device 10, and the like. While the method 240 is described using steps in a specific sequence, it should be understood that the present disclosure contemplates that the described steps may be performed in different sequences than the sequence illustrated, and certain described steps may be skipped or not performed altogether.

In process block 241, the processor 12 receives an input signal (e.g., the input signal 100). In particular, the input signal 100 may include a signal for which power is to be determined. In process block 242, the processor 12 sends the input signal 100 to a first portion of a power detector core (e.g., the power detector core 182). The first portion may include, for example, the main branch 126 of the power detector 67, and, more particularly, the square current circuit 104A of the main branch 126. In process block 244, the processor 12 may receive the reference signal 130 and send the reference signal 130 to a second portion of the power detector core 182. The second portion may include, for example, the reference branch 128 of the power detector 67, and, more particularly, the square current circuit 104B of the reference branch 128.

In process block 246, the processor 12 generates a mirror input signal. In particular, the processor 12 may cause the diode current mirror circuitry 110A of the main branch 126 to generate the mirrored input current signal 120. The processor 12 then causes the oscillator and counter circuitry 124A of the main branch 126 to reverse current of the mirrored input current signal 120 when voltage of the mirrored input current signal 120 reaches a threshold voltage (e.g., the first, higher threshold voltage value 154). The processor 12 may also cause the oscillator and counter circuitry 124A to reverse current of the mirror input current signal 120 when voltage of the mirrored input current signal 120 reaches a second threshold voltage (e.g., the second, lower threshold voltage value 162). The processor 12 causes the oscillator and counter circuitry 124A to generate a first count based on a number of times the current is reversed (e.g., when a period 164 of the voltage 152 signal is generated).

In process block 248, the processor 12 generates a mirror reference signal. In particular, the processor 12 may cause the diode current mirror circuitry 110B of the reference branch 128 to generate the mirrored reference current signal 134. The processor 12 then causes the oscillator and counter circuitry 124B of the reference branch 128 to reverse current of the mirrored reference current signal 134 when voltage of the mirrored reference current signal 134 reaches a threshold voltage (e.g., the first, higher threshold voltage value 154). The processor 12 may also cause the oscillator and counter circuitry 124B to reverse current of the mirrored reference current signal 134 when voltage of the mirrored reference current signal 134 reaches a second threshold voltage (e.g., the second, lower threshold voltage value 162). The processor 12 causes the oscillator and counter circuitry 124B to generate a second count of times based on a number of times the current is reversed (e.g., when a period 164 of the voltage 152 signal is generated).

In process block 250, the processor 12 determines a power value based on the first count and the second count. In particular, the processor 12 may implement any combination of Equations 1-8 to determine the code or signal level representing power detected in the input signal 100. In this manner, the processor 12 and/or the power detector 67 may perform the method 240 to determine power in the input signal 100 based on current.

Figure 12:
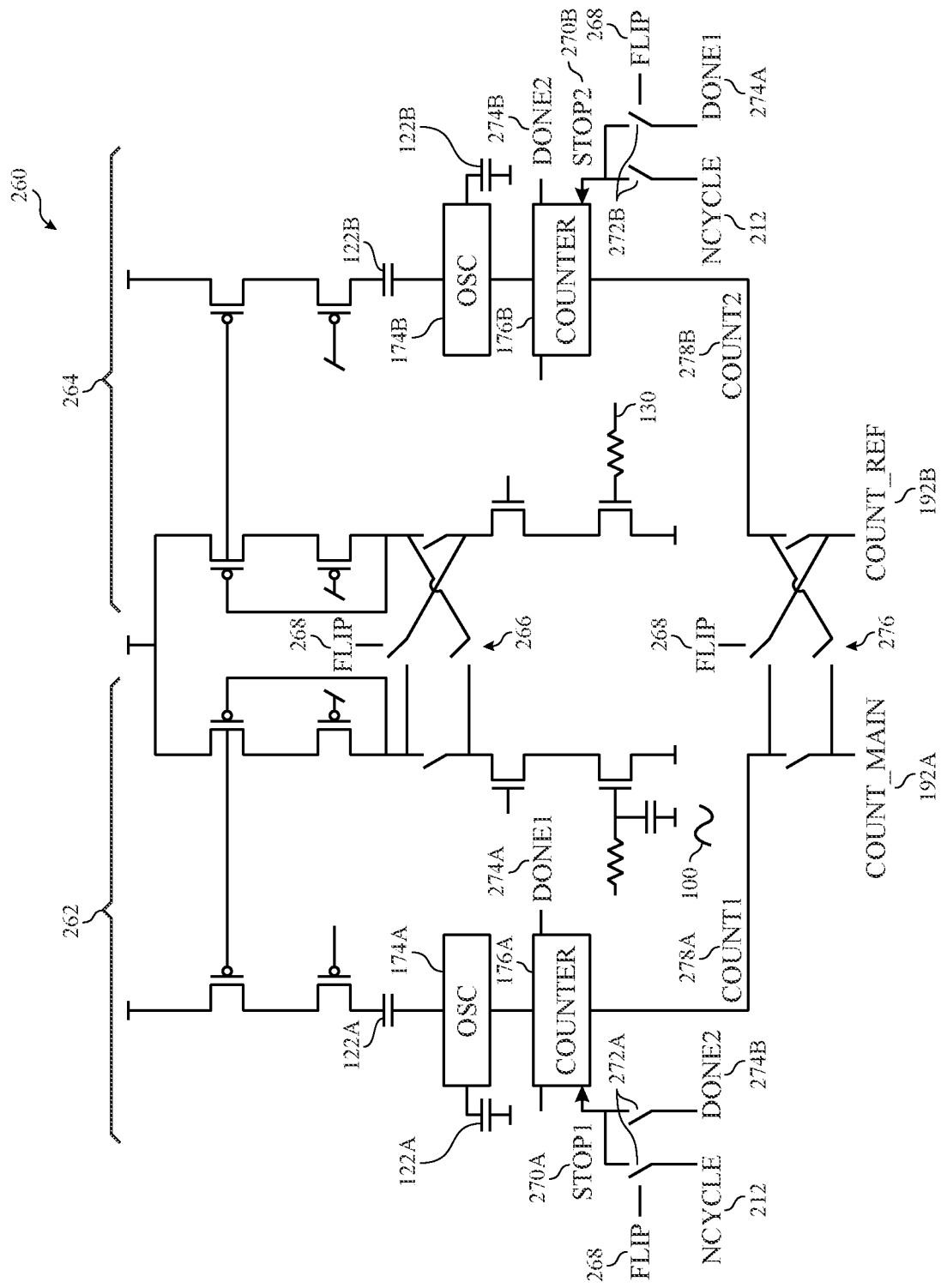
FIG. 12 is a circuit diagram of an example implementation circuit of the current mode power detector of FIG. 5 that reduces or cancels out offset (e.g., flicker noise) and/or mismatch in diode current mirror circuitries and oscillator and counter circuitries, according to embodiments of the present disclosure.

FIG. 12 is a circuit diagram of an example implementation circuit 260 of the current mode power detector 67 that reduces or cancels out offset (e.g., flicker noise) and/or mismatch in the diode current mirror circuitries 110 and the oscillator (or inverter) and counter circuitries 124, according to embodiments of the present disclosure. In particular, the processor 12 and/or the power detector 67 may flip or swap the main and reference branches 126, 128 (e.g., by sending the input signal 100 to the reference branch 128 and the reference signal 130 to the main branch 126) for at least some time period (e.g., equal to that of not flipping the branches 126, 128). As illustrated, the circuit 260 may include a first branch 262 and a second branch 264, similar to the first and second branches 126, 128 of the example implementation circuit 170 illustrated in FIG. 7. Additionally, the first branch 262 and the second branch 264 may be coupled by switching circuitry 266 (illustrated as a pair of switches). The switching circuitry 266 may be controlled by a digital FLIP signal 268, as illustrated. The FLIP signal 268 may cause the switching circuitry 266 to couple the first branch 262 to the input signal 100 or the reference signal 130, and the second branch 264 to the reference signal 130 or the input signal 100. Similarly, inputs to the counters 176 that stop the counters 176 (e.g., provide a STOP1 signal 270A or a STOP2 signal 270B) may also be coupled to switching circuitries 272A, 272B (collectively 272) controlled by the FLIP signal 268. The FLIP signal 268 may cause the switching circuitry 272A to couple the input to the counter 176A to (e.g., provide the STOP1 signal 270A as) the n cycle 212 signal (e.g., in the case that the first branch 262 receives the reference signal 130) or the DONE2 signal 274B generated by the counter 176B of the second branch 264 (e.g., in the case that the first branch 262 receives the input signal 100). The FLIP signal 268 may also cause the switching circuitry 272B to couple the input to the counter 176B to (e.g., provide the STOP2 signal 270B as) the n cycle 212 signal (e.g., in the case that the second branch 264 receives the reference signal 130) or the DONE1 signal 274A generated by the counter 176A of the first branch 262 (e.g., in the case that the second branch 264 receives the input signal 100). Outputs of the counters 176, having signals COUNT1 278A and COUNT2 278B (collectively 278), may be coupled to switching circuitry 276, which may also be controlled by the FLIP signal 268. The FLIP signal 268 may cause the switching circuitry 276 to output the COUNT1 278A as the COUNT_MAIN signal 192A (e.g., in the case that the first branch 262 receives the input signal 100) and the COUNT2 278B as the COUNT_REF signal 192B (e.g., in the case that the second branch 264 receives the reference signal 130), or the COUNT2 278B as the COUNT_MAIN signal 192A (e.g., in the case that the second branch 264 receives the input signal 100) and the COUNT1 278A as the COUNT_REF signal 192B (e.g., in the case that the first branch 264 receives the reference signal 130).

The processor 12 may periodically change flip or swap which branches 262, 264 receive the input and reference signals 100, 130 by changing the value of the FLIP signal 268. For example, the FLIP signal 268 may include a bit having a logical low value (e.g., 0) or logical high value (e.g., 1), and the processor 12 may periodically change the value of the bit (e.g., every 4 microseconds (μs) or less, 8 μs or less, 16 μs or less, 32 μs or less, 32 μs or more, and so on). For example, if the power detector 67 shown in FIG. 7 generates a symbol, code, or signal level every 8 μs, the processor 12 may flip the branches 126, 128 receiving the input and reference signals 100, 130 every 4 μs to generate two sub-symbols (e.g., CODE1 and CODE2) That is, for a first 4 μs period, the processor 12 may set the FLIP bit to the logical low value such that the power detector 67 operates as shown in FIG. 7, sending the input signal 100 to the first branch 262 and the reference signal 130 to the second branch 264, and outputting a first count value. For a second 4 μs period, the processor 12 may set the FLIP bit to a logical high value such that the power detector 67 operates by sending the input signal 100 to the second branch 264 and the reference signal 130 to the first branch 262, and outputting a second count value. The processor 12 may repeat this pattern for any suitable period of operation.

The first code (CODE1) generated for a first FLIP signal value 268 (e.g., a logical low value) may be expressed by the following equation:

$$\text{code1} = n_{cycle} \times (m + V_n) \times \frac{I_{Main}}{I_{Ref}} \quad \text{(Equation 9)}$$

The variable m may refer to the mismatch between the diode current mirror circuitries 110 and/or the oscillator (or inverter) and counter circuitries 124 of the branches 262 and 264, and the variable Vn may refer to the offset or flicker noise between the diode current mirror circuitries 110 and/or the oscillator and counter circuitries 124 of the branches 262 and 264. The second code (CODE2) generated for a second FLIP signal value 268 (e.g., a logical high value) may be expressed by the following equation:

$$\text{code2} = n_{cycle} \times \frac{I_{Main}}{(m + V_n) \times I_{Ref}} \quad \text{(Equation 10)}$$

The codes for each time period may be combined to generate the code (CODE) for the total time period of operation using the following equation:

$$\text{code} = \sqrt{\text{code1} \times \text{code2}} = n_{cycle} \times \frac{I_{Main}}{I_{Ref}} \quad \text{(Equation 11)}$$

As illustrated, the example implementation circuit 260 of the current mode power detector 67 shown in FIG. 12 enables the mismatch (m) and offset (Vn) between the diode current mirror circuitries 110 and/or the oscillator and counter circuitries 124 of the branches 262 and 264 to cancel out, resulting in a code that may not be affected by such variations.

In some instances, while the capacitor 122 is storing charge of the voltage 152 of the mirrored input current signal 120, as shown in the plot 150 of FIG. 6, the corresponding counter 176 may receive the done signal 190 (e.g., the DONE_MAIN signal 190A or the DONE_REF signal 190B). After receiving the done signal 190, the counter 176 may output its count value as a count signal 192 (e.g., the COUNT_MAIN signal 192A or the COUNT_REF signal 192B). The capacitor 122 may then discharge, and the charge of a count stored in the capacitor 122 may not be added to this count signal 192 or digital code (e.g., for a first time period, such as 8 μs or less, 16 μs or less, 32 μs or less, 32 μs or more, and so on). However, in the case that there is another digital code to be generated (e.g., for a second time period, such as 8 μs or less, 16 μs or less, 32 μs or less, 32 μs or more, and so on), because the capacitor 122 discharged, the previous charge, which was not included in the previous count signal 192 or digital code, may also not be included in the next count signal 192 or digital code.

Figure 13:
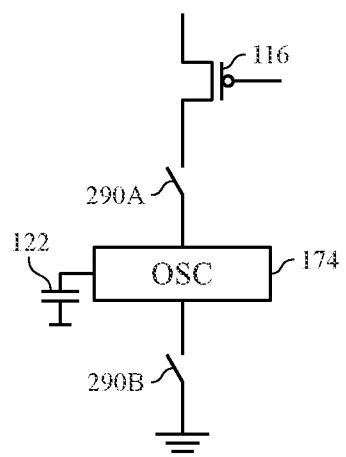
FIG. 13 is a circuit diagram of a portion of the current mode power detector of FIG. 5 including an oscillator having an integrated gated ring oscillation function, according to embodiments of the present disclosure.

To address this issue, in some embodiments, the oscillators 174 may include an integrated gated ring oscillation function, as shown in a circuit diagram of FIG. 13. The processor 12 may close or activate switches 290A, 290B (collectively 290) at least between when the START signal 186 is received and when the done signal 190 is received, enabling the capacitor 122 to increase charge and discharge during operation of the power detector 67 as described with respect to the plot 150 of FIG. 6. When the done signal 190 is received, the processor 12 may open or deactivate the switches 290, causing the capacitor 122 to store its current charge, rather than discharge (e.g., completely). In this way, the charge stored in the capacitor 122 may be included or added for the next time period to the digital code to be generated, providing a more accurate digital code and power measurement.

In some instances, there may be a mismatch between the square current circuit 104A of the main branch 126 and the square current circuit 104B of the reference branch 128. This mismatch may contribute to a change in a relationship or ratio between $I_{Main}$ and $I_{Ref}$, which may affect cause or exacerbate a variation in performance of the power detector 67 due to temperature changes (e.g., temperature drift). In particular, the mismatch may be exhibited in threshold voltages of transistors (e.g., 112, 114, 116, 118) of the square current circuits 104, and, as such, the corresponding offset may be referred to as Vth. To compensate for the mismatches, the processor 12 may adjust a gate-source voltage (VGS) of one or more of the transistors 112, 114, 116, 118. The VGS may be determined via a calibration process.

In particular, the calibration process may include setting the input signal 100 equal to the reference signal 130 (e.g., setting both to bias voltages). Different gate-source voltages may be applied to the one or more of the transistors 112, 114, 116, 118 at a given temperature until the COUNT_MAIN signal 192A or the COUNT_REF signal 192B provide the same count, thus compensating for a mismatch between the transistors 112, 114, 116, 118. In some embodiments, the gate-source voltage resulting in the COUNT_MAIN signal 192A or the COUNT_REF signal 192B providing the same count may be saved in a data structure, such as a lookup table (e.g., stored in the memory 14 or the storage 16), and may be indexed by the given temperature. Moreover, multiple gate-source voltages may be determined at different temperatures that result in the COUNT_MAIN signal 192A or the COUNT_REF signal 192B providing the same count, and also stored in the data structure, indexed by each different temperature. Then, in operation, the processor 12 may provide the compensating gate-source voltage to the applicable transistor(s) 112, 114, 116, 118 corresponding to the current ambient or operating temperature (e.g., as provided by a temperature sensor coupled to the processor 12).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:
   one or more antenna ports;
   a transceiver coupled to the one or more antenna ports, the transceiver comprising a power detector comprising
      a first current mirror;
      a second current mirror coupled to the first current mirror;
      a first oscillator coupled to the first current mirror;
      a first counter coupled to the first oscillator;
      a second oscillator coupled to the second current mirror; and
      a second counter coupled to the second oscillator.

2. The electronic device of claim 1, wherein the first current mirror is configured to receive input current information.

3. The electronic device of claim 2, wherein the first oscillator is configured to convert the input current information into input frequency information.

4. The electronic device of claim 3, wherein the first counter is configured to generate a count based on the input frequency information.

5. The electronic device of claim 2, wherein the input current information is associated with an input signal, the electronic device comprising processing circuitry configured to determine a power value associated with the input signal based on the first counter and the second counter.

6. The electronic device of claim 1, wherein the second current mirror is configured to receive reference current information.

7. The electronic device of claim 6, wherein the second oscillator is configured to convert the reference current information into reference frequency information.

8. The electronic device of claim 7, wherein the second counter is configured to generate a count based on the reference frequency information.

9. A transceiver comprising:
one or more amplifiers; and
a power detector coupled to the one or more amplifiers, the power detector comprising
a first current mirror configured to receive an input signal and generate a mirrored input signal;
a second current mirror coupled to the first current mirror, the second current mirror configured to receive a reference signal and generate a mirrored reference signal;
a first oscillator configured to generate a first clock signal based on a first current of the mirrored input signal;
a first counter configured to generate a first count based on a first number of clock cycles of the first clock signal;
a second oscillator configured to generate a second clock signal based on a second current of the mirrored reference signal; and
a second counter configured to generate a second count based on a second number of clock cycles of the second clock signal.

10. The transceiver of claim 9, wherein the power detector comprises a first square current circuit coupled to the first current mirror, the first square current circuit configured to receive the input signal and generate a first mean square input current signal, the first current mirror configured to receive the first mean square input current signal.

11. The transceiver of claim 10, wherein the power detector comprises a second square current circuit coupled to the second current mirror, the second square current circuit configured to receive the reference signal and generate a second mean square input current signal, the second current mirror configured to receive the second mean square input current signal.

12. The transceiver of claim 9, wherein the reference signal comprises a bias voltage.

13. The transceiver of claim 9, wherein the first oscillator configured to reverse the first current of the mirrored input signal based on a voltage of the mirrored input signal reaching a threshold, and the second oscillator configured to reverse the second current of the mirrored reference signal based on a voltage of the mirrored reference signal reaching the threshold.

14. The transceiver of claim 13, wherein the first oscillator comprises a first capacitor, the second oscillator comprises a second capacitor, and the threshold comprises a threshold voltage of the first capacitor and the second capacitor.

15. The transceiver of claim 9, wherein the first oscillator comprises a current-controlled oscillator.

16. A method for power detection, comprising
reversing a first current of a first signal;
generating a first count based on the first current being reversed;
reversing a second current of a second signal;
generating a second count based on the second current being reversed; and
outputting an indication of a power of the first signal based on the first count and the second count.

17. The method of claim 16, comprising generating a clock signal based on the second current of the second signal.

18. The method of claim 17, wherein the second count is based on a predetermined number of cycles of the clock signal.

19. The method of claim 18, wherein the indication is based on the predetermined number of cycles, the first current, and the second current.

20. The method of claim 18, comprising stopping the first count based on the second count reaching the predetermined number of cycles of the clock signal.

* * * * *